(12) United States Patent
Dacey

(10) Patent No.: US 7,316,513 B1
(45) Date of Patent: Jan. 8, 2008

(54) OPTICAL-FIBER MECHANICAL SPLICING TECHNIQUE

(75) Inventor: James P. Dacey, Taunton, MA (US)

(73) Assignee: Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 11/320,723

(22) Filed: Dec. 30, 2005

(51) Int. Cl.
*G02B 6/255* (2006.01)

(52) U.S. Cl. ............................ 385/95; 385/98; 385/99; 65/501

(58) Field of Classification Search ............ 385/95–99; 65/501
See application file for complete search history.

(56) References Cited

U.S. PATENT DOCUMENTS

| | | | |
|---|---|---|---|
| 6,186,675 B1 * | 2/2001 | Ruegenberg | 385/96 |
| 6,520,689 B2 * | 2/2003 | DeMartino et al. | 385/98 |
| 6,866,429 B2 * | 3/2005 | Wang et al. | 385/96 |
| 6,921,216 B1 * | 7/2005 | Li et al. | 385/96 |
| 7,059,782 B2 * | 6/2006 | Nikonov et al. | 385/98 |

* cited by examiner

Primary Examiner—Kevin S. Wood

(57) ABSTRACT

A portable optical-fiber cutter is used to slice a first optical-fiber at an advantageous angle to control reflections and at a suitable length to mate with a similar second optical-fiber that was pre-sliced at a complementary angle in the factory and configured as a receptacle for the first optical-fiber. This technique avoids the need for installation of two-ended, factory pre-connectorized optical-fiber cable and permits usage of a narrow-diameter protective "microduct" to enclose the optical fiber cable rather than requiring large-diameter protective duct to allow passage of a pre-connectorized connector there-through. Space is saved, particularly in large multi-unit apartment buildings where available space may be at a premium for large bundles of multiple optical cables. This technique also results in saving large amounts of technician-installer time when compared with the current time-consuming technique of fusion splicing.

12 Claims, 5 Drawing Sheets

OPTICAL-FIBER MECHANICAL SPLICING TECHNIQUE

BACKGROUND OF THE INVENTION

1. Field of the Invention

The present invention relates to apparatus and method for facilitating installation of optical-fiber (fiber optic) cable used for communication purposes and, more particularly, for mechanically splicing optical-fiber cable in the field during installation in a manner that results in an efficient optical interface without producing harmful light reflections.

2. Description of Prior Art

The evolution of communication technology is in the direction of ever-faster communication with ever-increasing bandwidth. Optical-fiber cable offers these improvements over copper wire, but imposes challenges which copper wire technology did not present. For example, copper wires can be readily spliced and/or soldered together, where the resultant contact or joint almost always offers good electrical conductivity without inhibiting communication, but not so with optical-fiber cable. Optical-fiber cable (also known as fiber-optic cable), made from glass, is not capable of being readily spliced in a time-efficient manner, as compared with copper wire splices. Optical-fiber uses light energy as its communication medium rather than the familiar flow of electrons, i.e., "electricity", used in copper wire. A bad optical "joint" can attenuate forward light transmission and cause reflection of light waves back to the light source which can interfere with operation of the light source and become a major problem.

The assignee of the present invention is a large telecommunications company which is installing optical-fiber cable (fiber optics) to its present and future customer base. When installing this fiber into apartment houses or multiple dwelling units (MDU's), the current technique is to bring the optical-fiber cable from, for example, a pole on the street to an external terminal affixed to the outside of the MDU building. From that connection point, a path is created to each apartment unit by using "microduct" which is a protective casing which may have an inside diameter of approximately 0.25-0.50 inches. A fiber optic cable which may have an outside diameter of approximately 0.125 inches containing a clad optical strand along the longitudinal axis of the cable is pulled through the microduct into each dwelling unit. For a two-hundred unit apartment building, for example, two-hundred separate microducts each containing its own optical cable with centralized and clad glass optical strand is connected from the external terminal, each microduct going to one of the two-hundred apartments respectively.

Today, fiber optic cable of pre-determined lengths with factory-connectorized both ends can be readily obtained. The connectors of these connectorized ends then can readily plug into jacks which are designed to matingly-accept the connectors. Although this would eliminate the need for splicing optical-fiber cable in the field, a connector is too large to fit into and through the microduct. The cross-sectional dimension of these connectors can be at least an order of magnitude larger than the outside diameter of the fiber optic cable for which they act as terminations. Larger diameter microduct could be used to accommodate pre-connectorized optical-fiber cable, but with a large apartment building (e.g., 200 units) a space issue develops—there simply isn't enough space to bundle 200 "large-diametered" microducts and run them up a wall inside a building prior to their being dispersed to the 200 dwelling units. That would require too much space. Thus, the small inside diameter microduct is used which requires elimination of one pre-connectorized end. Indeed, each un-connectorized or "raw" glass fiber end is fed through the microduct into one of the dwelling units. That raw end then needs to be properly and optically coupled to something that would serve to continue the light energy communication to its intended destination. There could be an optical coupling to a raw glass end of another optical cable in an apartment, the other end of the other optical cable being pre-connectorized and connectable to a wall plate, or the equivalent, mounted in the apartment. In other words, an optical cable splice of the two "raw" optical-fiber ends needs to be performed in the apartment unit.

The current method of making such a splice involves melting the ends of the glass strands where they touch in what is called a "fusion" splice. This may be analogous to welding two pieces of metal together. The glass strands are only microns in diameter, possibly on the order of 100 microns or less. (One micron is one-thousandth of a millimeter or about 0.000039 inch.) In the fusion splice, the strands are cut at right angles to the axis of the strand. The fusion splice, involving an electrical arc, is sufficiently good to avoid both substantial forward transmission light-loss and substantial problematical light reflection, the latter of which otherwise could be reflected back to the light source causing serious problems. However, a major drawback in performing the fusion splice is the very long time required for a technician to perform the splice—some 45 minutes or longer per splice. When outfitting a 200 unit apartment building, for example, this can result in a large man-hour impact, negatively impacting the costs of installation.

What is needed is a technique for providing a splice between two glass strand ends of mere microns in diameter, each contained within its own optical-fiber cable, in a quick and efficient manner as compared with the present forty-five minute splice-time needed for a fusion splice, and which provides a splice that (1) does not significantly attenuate forward transmission of the light signal and (2) does not return light reflections from the splice via the optical-fiber back to the light source, otherwise causing damage or deteriorated operation. The present invention is a welcome solution to these drawbacks of the prior art.

SUMMARY OF THE INVENTION

The present invention relates to a method and an apparatus for operatively coupling two optical-fibers through which electromagnetic energy signals, such as visible light signals, are transmitted for communication purposes. The invention is not limited to wavelengths of light in the visible spectrum, and is also intended to operate with electromagnetic energy signals in the infra-red spectrum and beyond and in the ultra-violet spectrum and beyond.

The method includes mechanically slicing a raw end of one of the fibers at a pre-determined non-right angle relative to the longitudinal axis of that fiber and at a pre-determined distance from the face of a connector-clamp holding that fiber. This provides a first sliced end. The other optical-fiber has a raw end which is mechanically sliced at the complement of the pre-determined angle. This provides a second sliced end. The second sliced end is held in a manner to form a receptacle for the first sliced end. The first and second sliced ends are mechanically bound together in a substantially coplanar and congruent interface, whereby the interface transmits substantially all of the energy associated with the light signals and reflects any of the energy not transmitted therethrough in a manner to avoid transmission of reflected energy back to the source of the light energy. The second sliced end is held within a pluggable jack. The pluggable jack is mountable within a wall plate. The raw end of the one of the fibers is mechanically sliced by way of a portable diamond wheel cutter, allowing an optical cable installer to obtain the first sliced end at the site where the pluggable jack shall be mounted into the wall plate. The connector clamp holding the one of the fibers and the pluggable jack holding the other of the fibers have complementary keying means. When the keying means are fully mated, the first and second sliced ends form the substantially coplanar and congruent interface.

The apparatus includes a connector-clamp for holding the one of said fibers and a mechanical slicer adapted to grip said connector clamp and slice a raw end of the fiber at a pre-determined non-right angle relative to the axis of the fiber and at a pre-determined distance from the face of the connector-clamp, thereby providing a first sliced end. A pluggable jack is also provided which includes the other of the two fibers which was pre-sliced at the complement of the predetermined non-right angle, thereby providing a second sliced end. The jack forms a receptacle for the first sliced end. Means for binding together the first and second sliced ends in a substantially coplanar and congruent interface are provided. Therefore, the interface transmits substantially all of the energy associated with the light signals through the interface. Any and all light energy reflected from the interface and not transmitted therethrough is reflected in a manner to avoid transmission of the reflected energy back to the light energy source.

The apparatus further includes a pluggable jack which is mountable into a wall plate, along with means for utilizing a portable diamond wheel cutter to allow an optical-fiber cable installer to obtain the first sliced end at the site of installation of the pluggable jack into the wall plate. Also, keying means located on the connector-clamp with complementary keying means located on the pluggable jack are provided, for ensuring proper orientation between connector-clamp and pluggable jack when mated. The substantially coplanar and congruent interface is formed when keying means and complementary keying means are fully mated.

DETAILED DESCRIPTION OF THE PREFERRED EMBODIMENTS

Figure 1B:
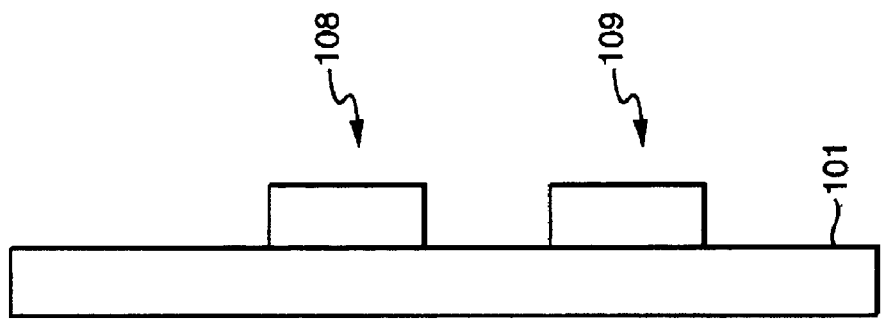
FIG. 1B is the side view of FIG. 1A.
Figure 1A:
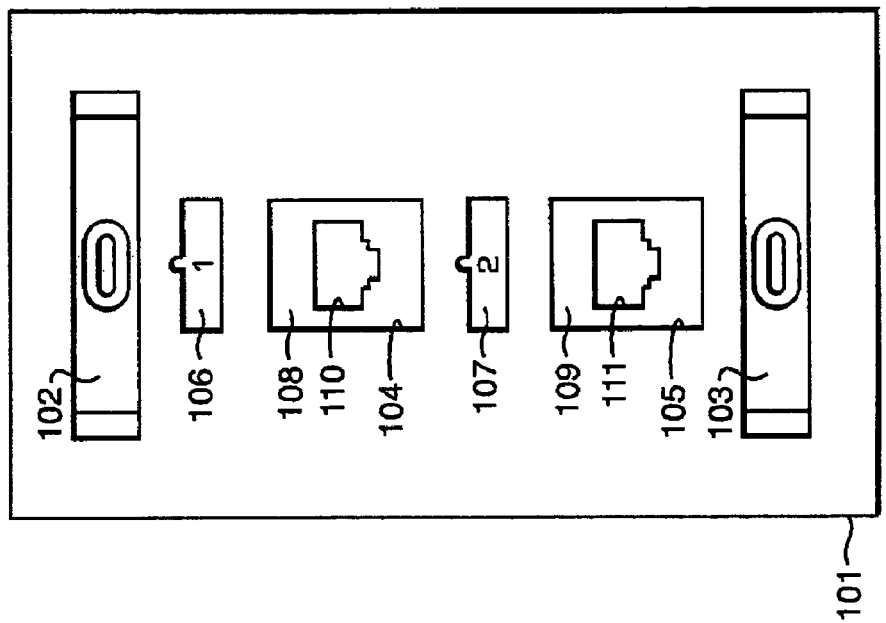
FIG. 1A is a front view of an exemplary schematic diagram of a commercially-available mountable wall plate into which an embodiment of the present invention is pluggable.

FIG. 1 depicts a commercially-available, mountable, wall plate into which an embodiment of the present invention is pluggable. Wall plate 101 is shown in front view at the left side of FIG. 1 and is shown in side view at the right side of FIG. 1. Wall plate 101 includes mounting apertures 102 and 103. Phone line designator 106 identifies aperture 104 as line "1" and line designator 107 identifies aperture 105 as line "2." Jack 108, which includes an embodiment of the present invention (to be described), is shown mounted in aperture 104. Another jack 109 is shown mounted in aperture 105. Apertures 110 and 111 may be familiar-looking phone-jack apertures into which telephone lines would ordinarily be plugged if this wall plate were being used directly with telephones (telephone lines not shown). However, in this instance, fiber optic jumpers (not shown) would be plugged into these apertures, those jumpers operatively coupled to, for example, a fiber optic network terminal (not shown). There could then be operative couplings from that fiber optic network terminal to installed consumer-related equipment such as TV, telephone, computer, etc.

Figures 2A, 2B, 2C:
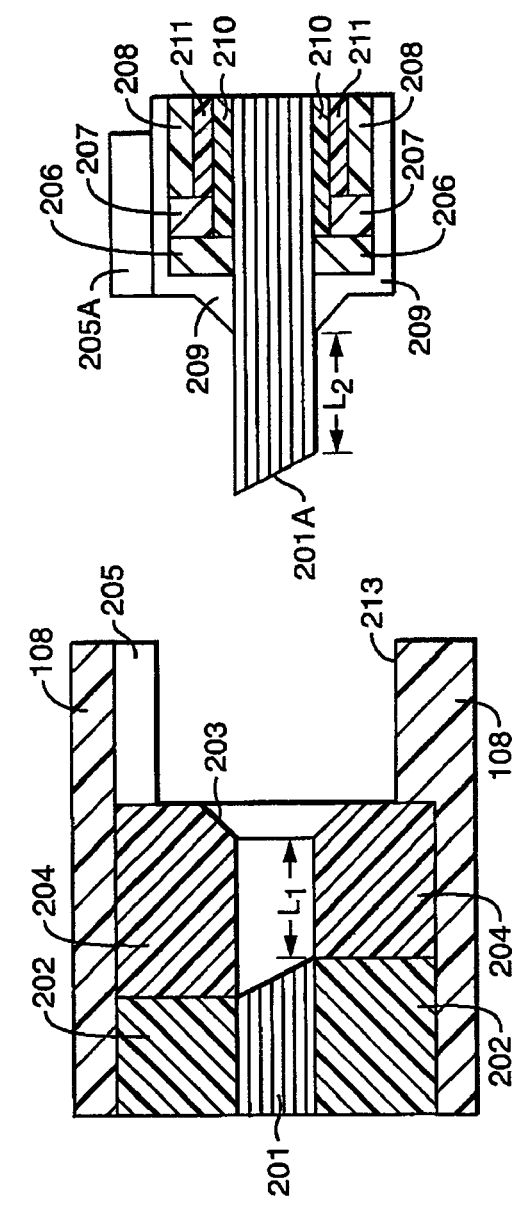
FIG. 2A is a cross-sectional view of an exemplary pluggable jack holding an optical-fiber having a pre-sliced end.
FIG. 2B is a cross-sectional view of an exemplary connector-clamp holding an optical-fiber having a sliced end.
FIG. 2C is a frontal elevation view of the connector clamp in its relationship to FIG. 2B, showing the section taken therethrough which is reflected by FIG. 2B.

FIG. 2 depicts the present invention in four related views. FIG. 2A is a cross-sectional view of an exemplary pluggable jack holding an optical-fiber having a pre-sliced end. Pluggable jack 108 is the same jack 108 shown in FIG. 1. Optical-fiber 201 is shown sliced at an angle which is other than a right angle relative to its longitudinal axis. In a preferred embodiment this angle is angularly-displaced from that right angle by approximately eight (8) degrees. In other words, this preferred embodiment angle is angularly displaced from its own longitudinal axis by eighty two (82) degrees measured in a clockwise direction from its axis. Optical-fiber 201 is circumferentially supported by optical cable insulation and support material 202 in a firm manner which constrains optical-fiber 201 from being displaced in a radial direction. This material can be made from plastic, its properties including resistance to expansion and contraction when exposed to temperature variations. Funnel 203 forms an aperture designed to accept and guide another like fiber to its center, and is similarly circumferentially supported by similar insulation and support material 204. Female keying means 205 is shown in the upper right of FIG. 2A, and the far inside face of the female keying means is shown in this view.

FIG. 2B is a cross-sectional view of a portion of an exemplary connector-clamp or "shoe" 209 holding an optical-fiber with a sliced end. The cross section is taken vertically through the axis of the optical-fiber, as shown in FIG. 2C which is a frontal view of the connector clamp of FIG. 2B, and reference may be made to both Figs. in this description. Glass fiber 201A has been sliced (to be described below) at an angle which is complementary to the angle to which optical-fiber 201 in FIG. 2A has been sliced and at a protrusion length $L_2$ which is equal to length $L_1$ of FIG. 2A, in accordance with principles of the present invention. Optical-fiber cladding 210, tightly circumscribes optical-fiber 210A (which is circular in transverse cross section) and is a dielectric which supports fiber 210A while being capable of absorbing light energy directed at it, and typically can be white. Insulation 211 circumscribes cladding 210, although not as tightly as the cladding-glass fit, offers substantial physical protection and electrical/optical insulation for the optical-fiber which it contains, and typically can be approximately 0.125 inches in outside diameter in yellow color. Colors are immaterial to the principles of operation of the present invention.

Three circumferential clamps are provided. Optical clamp 206 tightly holds optical-fiber 201A, and can be fashioned from plastic material which has a slight resilience to enable it to tightly choke the optical-fiber without cracking it. Cladding clamp 207 has an inside diameter slightly smaller than the outside diameter of the cladding and also contains small protrusions or teeth (not shown) from its surface configured to bite and hold white cladding 210. Typically, the white cladding has a degree of resilience to it and may typically have a 250 micron outside diameter, compared with the inside diameter of the cladding clamp measured between oppositely disposed protrusions at approximately 200 microns. This is a sufficient diameter-differential to cause a choking force on the white cladding/optical-fiber combination to render the combination immovable, both axially and rotationally. The teeth merely hold the cladding without penetrating it sufficiently to touch its optical-fiber center which may have a diameter approximately 100 microns. And, insulation clamp 208 circumscribes the yellow insulation 211 in a manner similar to the other clamps to add stability, but applies less force than the other clamps to allow some movement between the white cladding and its encapsulating yellow insulation to permit the cladded optical fiber to be pulled through the insulation, if need be. The reason for these clamps shall be explained more fully below.

Connector clamp 209 can be square, rectangular, or some other shape in cross section, formed of hard plastic material. It encompasses and provides radially-directed force for the three clamps discussed above as it pushes in a radial direction against the clamping materials. It has a front face which is formed with a conical flare, rim 212 of that flare being shown in FIG. 2C. In one embodiment the flare is configured to mate exactly with the opening of funnel 203. In another embodiment, to allow some "wiggle" room for optical fiber 201A in the event that optical fiber 201A is microns too long, the flare may be partially or completely eliminated, which would allow the optical fiber to push and displace in a direction other than pushing only directly against optical fiber 201. Male keying means 205A is shown at the top of connector clamp 209 and is designed to permit only one orientation of insertion of connector clamp 209 into pluggable jack 108. This is crucial for connector clamp bodies with square or rectangular transverse cross sections.

Figure 2D:
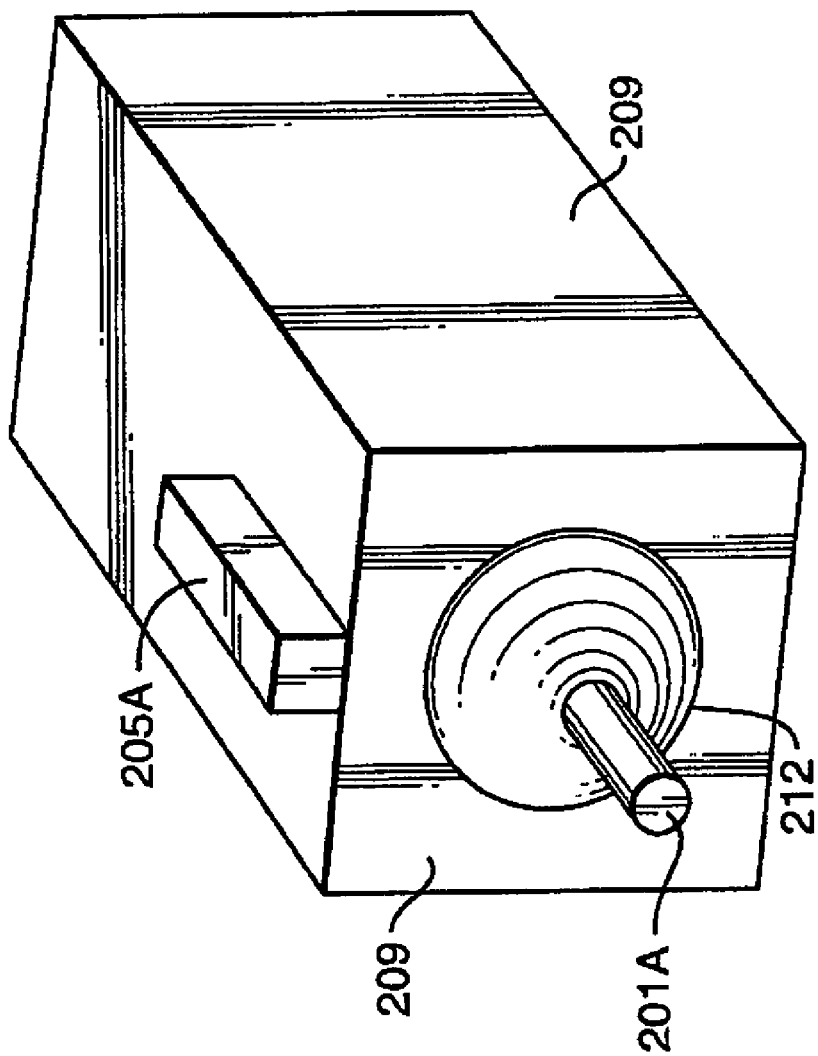
FIG. 2D is a perspective view of the connector clamp of FIGS. 2B and 2C.

FIG. 2D is a perspective view of connector clamp 209 of FIGS. 2B and 2C, with optical-fiber 201A, male keying means 205A and rim 212 being shown. It should be understood that the dimensional proportions in FIGS. 2A-2D are intentionally not depicted accurately for purposes of enhancing clarity of presentation. The diameter of the optical-fiber may be on the order of 100 microns or less (0.0039 inch), and it is not feasible to show a cleaved angle on that fiber if it were held to its rightful proportion with respect to, for example, connector clamp 209 which could be square shaped with each edge being on the order of 0.25 inch, almost 100 times larger. Also, the angle of slice or cleavage is shown at an angle which is more than the preferred embodiment of eight degrees, again to enhance clarity of presentation.

Figure 3:
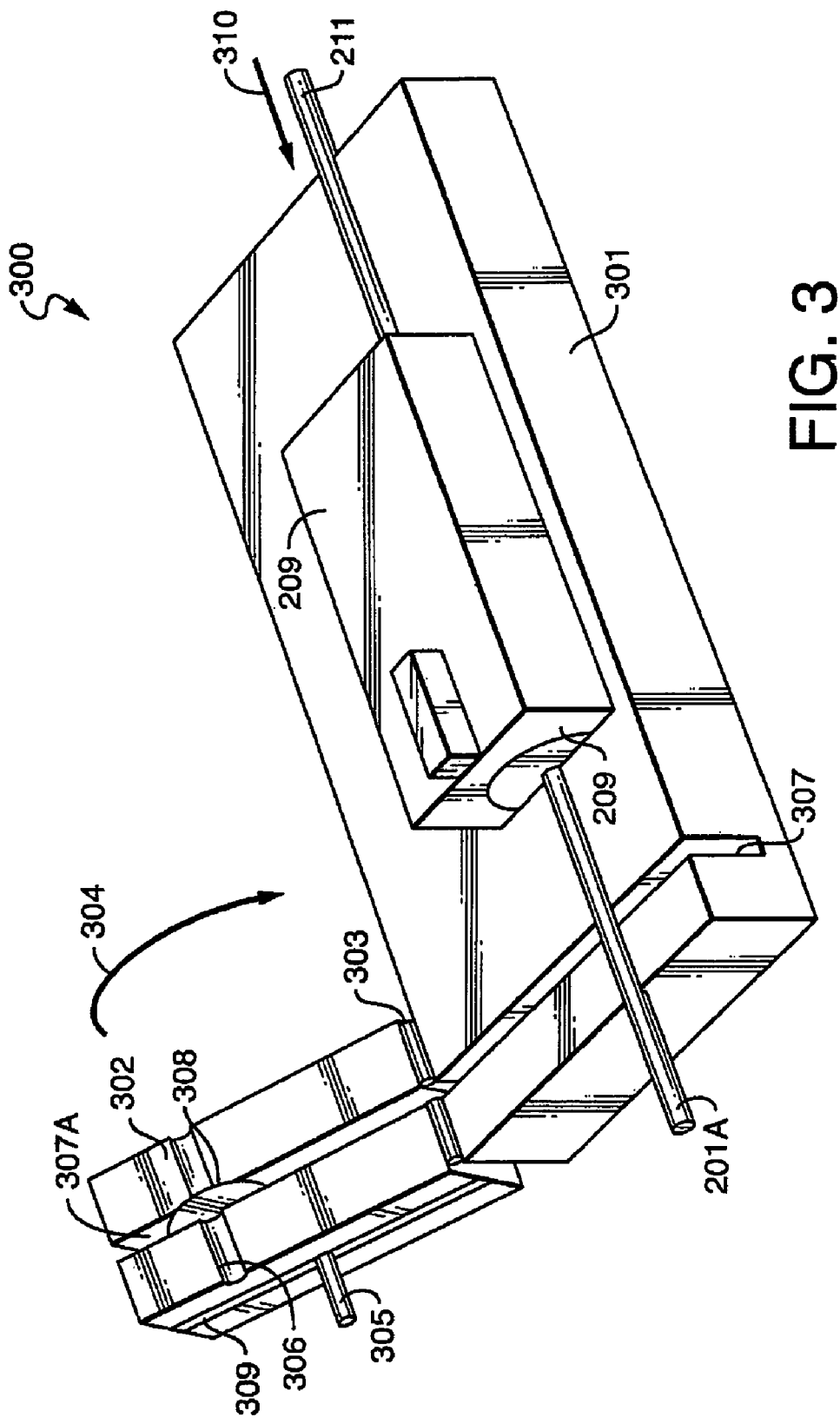
FIG. 3 is a schematic diagram of an exemplary embodiment of a portable diamond wheel cutting mechanism of the type that may be used in or with the present invention and shown supporting the pluggable jack and optical-fiber of FIGS. 2B-2D.

FIG. 3 is a schematic diagram of an exemplary embodiment of a portable diamond wheel optical-fiber cutter mechanism 300 of the type that may be used in or with the present invention and shown supporting the pluggable jack and optical-fiber of FIGS. 2B-2D. Diamond wheel cutter base 301 is shown supporting connector clamp 209. Connector clamp 209 can lie in a conforming channel (not shown) formed in cutter base 301. The channel shown conforms to connector clamp 209 in the embodiment without a conical flare. If a connector clamp having a conical flare is being used by the technician/installer, a different cutter mechanism 300 having a channel shape that matingly receives the conical flare (not shown) would be used. Also clamp body 209 can be held securely in place by other clamps, not shown. Optical-fiber 201A (again in exaggerated dimension) is shown protruding from clamp body 209 in the left direction, while insulation 211, encompassing cladding 210 (not shown) which encompasses optical-fiber 201A (not shown) protrudes from clamp body 209 in the right direction. Optical-fiber 201A also lies in a channel (not shown) formed within base 301. Groove 307 lies underneath optical-fiber 201A and intersects the channel holding optical-fiber 201A, thereby removing support at the intersection. Attached to mechanism body 301 by hinge 303 is diamond blade chassis 302 which holds, in one embodiment, rotatable diamond blade 308. In another embodiment, diamond blade 308 does not rotate. Also shown are grooves 306, 307A and 309, as well as hand control 305 which is attached to cutter 308.

In operation, consider FIGS. 2 and 3 together. When a fiber optic installer is requested to install a large number of "fiber-drops" in a large apartment building, he/she carries with him/her the portable cutter mechanism 300. While carried, chassis 302 is in a closed and locked position with diamond cutter wheel resting in groove 307 and with chassis 302 locked in place on top of base 301 by a latch (not shown). Of course, connector clamp 209 is not in its depicted position when cutter mechanism 300 is being transported with wheel chassis in locked position. Diamond wheel slicer 308, in one embodiment, is driven by a small portable and battery-powered motor (both motor and rechargeable battery not shown). The rotational axis of the motor is canted or tilted at an angle with respect to that plane of the surface of chassis 302 which mates with the surface of cutter base 301 when the hinged chassis is in a closed position. That angle of tilt can be fixed at the preferred embodiment angle of eight degrees. Grooves 307 and 307A are made sufficiently wide to allow for not only the width of cutter wheel 308 itself, but also to allow for the additional width needed due to the cant or tilt of the rotational axis of the wheel. The greater the tilt, the wider the groove or channel needs to be.

When an optical-fiber is to be cut, the following procedure is followed. The chassis is opened to the position shown in FIG. 3. A piece of optical-fiber cable is stripped by the technician to expose bare optical-fiber and a small amount of white cladding using a special hand tool which permits a precise amount of yellow insulation to be removed, exposing the white cladding beneath. The prepared optical-fiber with cladding and insulation is placed inside the body of connector clamp 209, either by insertion from the far right end using a funnel mechanism built-into the right end of connector clamp 209 and not unlike that shown in FIG. 2A, or by removing the top of clamp body 209, laying the optical-fiber with cladding and insulation therein, and thereafter snapping-shut the clamp connector (removable top and snap-lock not shown in FIG. 3). Connector clamp 209 with optical cable inserted therein are then placed into their respective channels (not shown) formed in base 301 for holding both connector clamp 209 and optical-fiber 201A.

With cutter 308 positioned by hand adjuster 305 within groove 307A to a position nearest hinge 303, chassis 302 is carefully closed and latched. Groove 306 fits over and secures optical fiber 201A. Alternatively, groove 306 may not be needed if the channel holding optical fiber 201A is deep enough. With battery power turned on, cutter 308 rotates at high speed and at the canted angle discussed above. Using hand adjuster 305, by sliding it transversely in groove 309, the canted rotating wheel transversely slices through the optical-fiber at the prescribed angle and at the appropriate length $L_2$ In an alternative embodiment, cutter 308 does not rotate at high speed under battery power. Instead, by using hand adjuster 305, cutter 308 may be drawn over the optical fiber which it scores allowing a clean break, or may be drawn back and forth over the optical fiber and thereby slicing it by result of the transverse motion. After multiple usages in this position, the diamond wheel can be hand-rotated to another position if and when the blade portion doing the slicing in its current position begins to get dull.

The location of the channel which holds connector clamp 209 with respect to location of channel 307 is precisely set to ensure that length $L_2$ is achieved. Thereafter, chassis 302 is opened, the snap (not shown) holding down connector clamp 209 is released, and connector clamp 209 is removed from base 301. Optical-fiber 201A can be cleaned with alcohol, to remove any debris from the fiber due to the cutting process. Connector clamp 209 is then oriented by the technician so that its male keying means 205A is aligned with female keying means 205, and is then inserted into aperture 213 as suggested by the juxtaposition of FIGS. 2B and 2A. When optical-fiber 201A makes contact with funnel 203, the relatively wide funnel mouth guides the optical-fiber into position so that its axis and the axis of optical-fiber 201 tend to become co-linear. Upon complete insertion, the face of optical-fiber 201A (which is now elliptical in shape because of the angular cut) is pressed against the elliptical face of optical-fiber 201. The conical flare on the face of connector clamp 209 in one embodiment may be designed to mate substantially with funnel 203, and connector clamp 209 is locked into place with pluggable jack 108, by locking means (not shown). In other embodiments, the conical flare on the face of connector clamp 209 may be configured to allow a small gap between connector clamp 209 and the cylindrical surface of optical fiber 201A to allow wiggle-room or play in a radial direction for optical fiber 201A after insertion, or may be completely eliminated to allow even more wiggle-room, to properly manage the situation where $L_2$ may be a few microns too long relative to length $L_1$.

Accordingly, equality of lengths $L_1$ and $L_2$ is important. Also it is important that the pre-sliced angle of optical-fiber 201 and the field-sliced angle of optical-fiber 201A be complementary. Accuracy of these angles is important in order to (1) make the elliptical sliced end of fiber 201 substantially coplanar with the elliptical sliced end of fiber 201A and (2) make the elliptical sliced end of fiber 201 substantially congruent (congruence=100% overlap) with the elliptical sliced end of fiber 201A, in order to pass maximum light energy therethrough with minimum attenuation and concomitantly minimize reflected light energy therefrom. The bigger the gap between, and the less overlap of, the sliced ends after insertion, the bigger the transmission loss. When a state of coplanar congruency is achieved, the longitudinal axes of portions of optical-fibers 201 and 201A contained within pluggable jack 108 and connector clamp 209 respectively are substantially co-linear.

To further ensure the appropriate interface between the two optical-fibers, the following technique may be employed. On the one hand, a thin coating of indexing gel may be applied to the tip of optical-fiber 201A after cleaning with alcohol, which passes light and offers a means of adding a few microns "length" to optical-fiber 201A, if needed. On the other hand, the above-noted loosening or complete elimination of the conical flare on the face of connector clamp 209 allows a radial-direction wiggle room for optical fiber 201A, so that there is the slightest "give" to optical-fiber 201 if optical-fiber 201A is a few microns too long. By using both of these techniques together, a few microns difference in either direction between lengths $L_1$ and $L_2$ is accounted for, ensuring an optimum connection.

Periodically, the portable slicer 300 can be returned to the factory to be re-aligned if necessary. For example, realignment can be accomplished by using a test jig having a standard optical-fiber embedded therein. Optical-fibers sliced by the returned portable slicer can be tested against the standard fiber in the test jig. Adjustment to the slicer under test is made until optical-fibers sliced in that slicer produce maximum light energy throughput. Other realignment techniques could be used.

Figure 4:
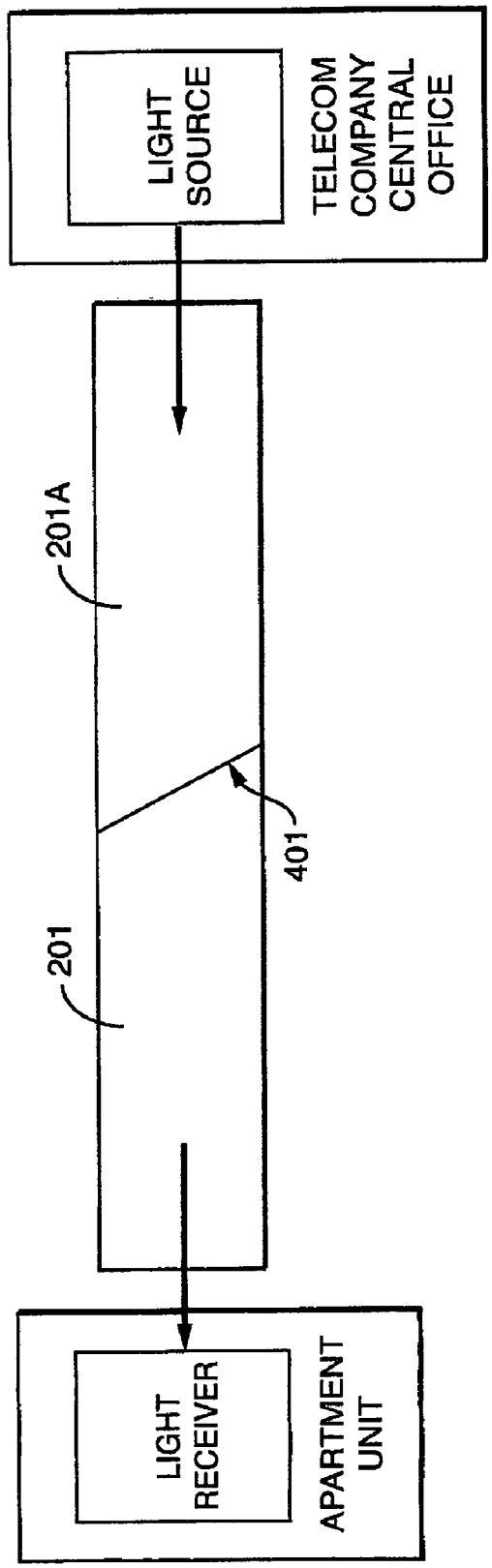
FIG. 4 is a schematic view of the two optical-fibers in their mated position showing, on edge, the coplanar and congruent interface there-between, long with light energy source and light energy receiver.

FIG. 4 is a schematic view of the two optical-fibers 201 and 201A in their mated position showing, on edge, a coplanar and congruent interface 401 therebetween. As a result of this optimum interface, virtually all light from the depicted light source that reaches the interface will pass through it and virtually none of the light reaching the interface will be reflected from it. Any light that is reflected from it is reflected into the cladding containing the optical-fiber. One property of that cladding is to absorb reflected light and attenuate it, thereby inhibiting or preventing it from being transmitted back to the light source. Any reflected light reaching the light source would interfere with the light source signal being generated. As shown, the light source may be positioned in a telecommunications company's central office, and the light receiver may be positioned inside an apartment unit of a telecommunications consumer who uses communication devices such as telephone, television, Internet or other communications gear which are fed signals via the installed optical-fiber connection.

The present embodiments are to be considered in all respects as illustrative and not restrictive. The scope of the invention, therefore, is indicated by the appended claims rather than by the foregoing description, and all changes which come within the meaning and range of equivalency of the claims are therefore intended to be embraced therein.

What is claimed is:

1. A method to be practiced during optical-fiber field installation, said method being for operatively coupling two optical-fibers through which light signals are transmitted, said method comprising:

mechanically slicing in the field during installation, a raw end of one of said fibers at a pre-determined non-right angle relative to the longitudinal axis of said one of said fibers and at a pre-determined distance from the face of a connector-clamp holding said one of said fibers to obtain a first sliced end;

mechanically pre-slicing prior to said installation in the field a raw end of the other of said two fibers at the complement of said pre-determined non-right angle relative to the longitudinal axis of said other of said two fibers to obtain a second pre-sliced end;

holding said second pre-sliced end in a manner to form a receptacle for said first sliced end; and mechanically binding together in the field said first sliced end and said second pre-sliced end in a substantially coplanar and congruent interface which transmits therethrough substantially all of the energy associated with said light signals and reflects any of the energy not transmitted therethrough in a manner to avoid transmission back to the source of said light energy.

2. The method of claim 1 wherein said second sliced end is held within a pluggable jack.

3. The method of claim 2 wherein said pluggable jack is mountable into a wall plate.

4. The method of claim 3 wherein said step of mechanically slicing said raw end of said one of said fibers comprises:

utilizing a portable diamond wheel cutter to allow an optical-fiber cable installer to obtain said first sliced end at the site of said field installation where said pluggable jack shall be mounted into said wall plate.

5. The method of claim 2 wherein said mechanically binding together comprises:

mating a keying means located on said connector-clamp with a complementary keying means located on said pluggable jack to form said substantially coplanar and congruent interface when said keying means and said complementary keying means are fully mated.

6. The method of claim 1 wherein said pre-determined non-right angle is obtained by angular-displacement of approximately eight degrees from a right angle position.

7. A method to be practiced during field installation of electromagnetic energy signal transmission fiber, said method being for operatively coupling two fibers through which electromagnetic energy signals are transmitted, said method comprising:

mechanically slicing in the field during installation a raw end of one of said fibers at a pre-determined non-right angle relative to the longitudinal axis of said one of said fibers to obtain a first sliced end;

mechanically pre-slicing prior to said installation in the field a raw end of the other of said two fibers at the complement of said pre-determined non-right angle relative to the longitudinal axis of said other of said two fibers to obtain a second pre-sliced end;

holding said second pre-sliced end in a manner to form a receptacle for said first sliced end; and mechanically binding together in the field said first sliced end and said second pre-sliced end in a substantially coplanar and congruent interface which transmits therethrough substantially all of the electromagnetic energy of said signals and reflects therefrom any of the electromagnetic energy not transmitted therethrough in a manner to control said reflected electromagnetic energy in any interaction with the source of said electromagnetic energy.

8. Apparatus for use during optical-fiber field installation, said apparatus being for operatively coupling two optical-fibers through which light signals are transmitted, said apparatus comprising:

a connector-clamp for holding said one of said fibers during said field installation;

a mechanical slicer for gripping said connector clamp and for slicing a raw end of said one of said fibers at a pre-determined non-right angle relative to the longitudinal axis of said one of said fibers and at a pre-determined distance from the face of the connector-clamp thereby providing a first sliced end;

a pluggable jack including the other of said two fibers having been pre-sliced prior to said field installation at the complement of said predetermined non-right angle relative to the longitudinal axis of said other of said two fibers and thereby providing a second sliced end, said jack forming a receptacle for said first sliced end; and means for mechanically binding together said first sliced end and said second sliced end in a substantially coplanar and congruent interface which transmits therethrough substantially all of the energy associated with said light signals and reflects all of the energy not transmitted therethrough in a manner to avoid transmission back to the source of said light energy.

9. The apparatus of claim 8 wherein said pluggable jack is mountable into a wall plate.

10. The apparatus of claim 8 wherein said mechanical slicer comprises:

means for utilizing a portable diamond wheel cutter to allow an optical-fiber cable installer to obtain said first sliced end at the site of said field installation of the pluggable jack into said wall plate.

11. The apparatus of claim 8 wherein said mechanically binding together means comprises:

keying means located on said connector-clamp with complementary keying means located on the pluggable jack, for ensuring proper orientation between said connector-clamp and said pluggable jack when mated to form the substantially coplanar and congruent interface when said keying means and said complementary keying means are fully mated.

12. The apparatus of claim 8 wherein said pre-determined non-right angle is angularly-displaced by approximately eight degrees from its right angle position.

\* \* \* \* \*